J. A. BENSON.
CAKE TIN.
APPLICATION FILED DEC. 13, 1913.
1,107,479.
Patented Aug. 18, 1914.
2 SHEETS—SHEET 2
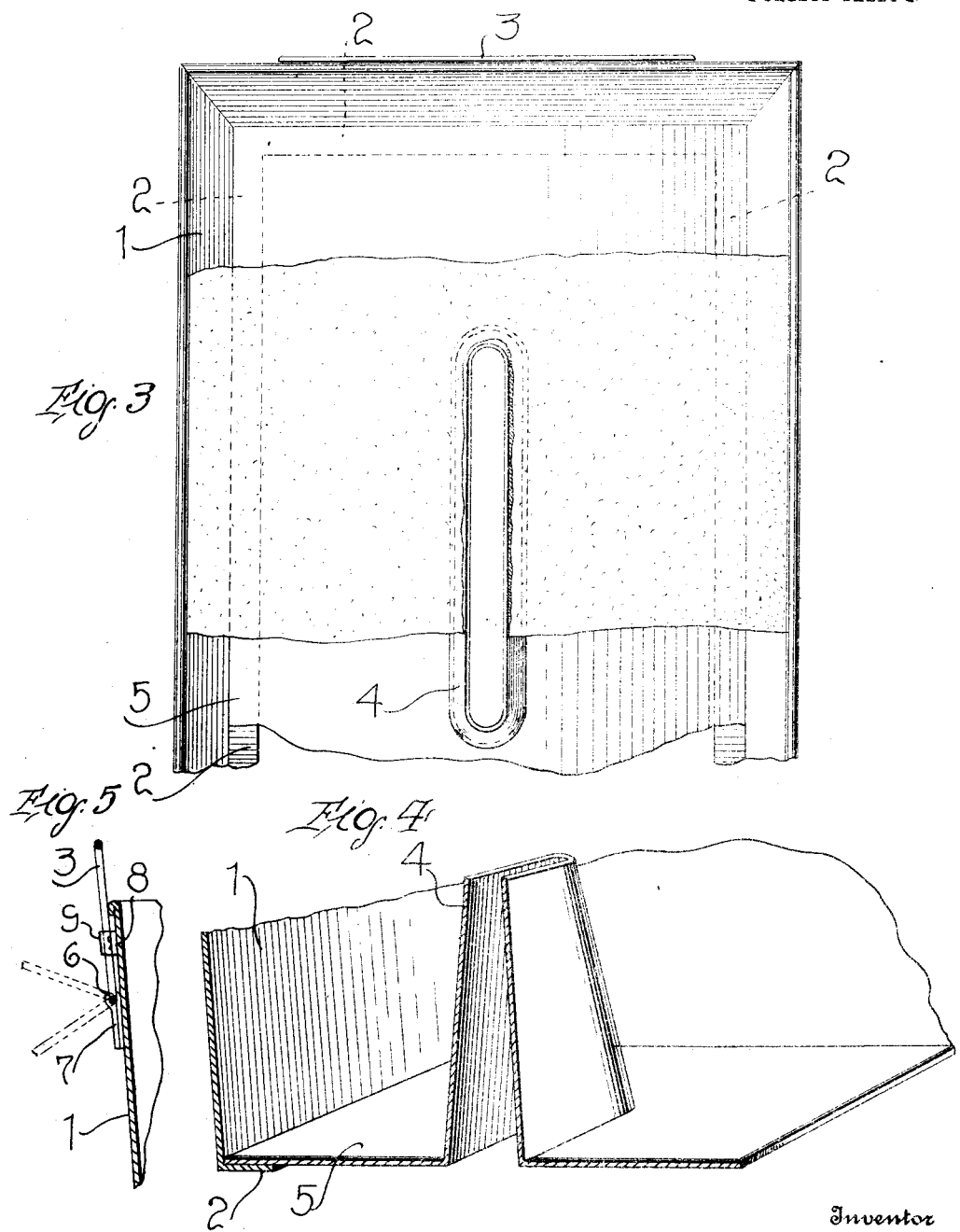
Inventor
JOSEPHINE A. BENSON.
Witnesses
By Watson E. Coleman
Attorney

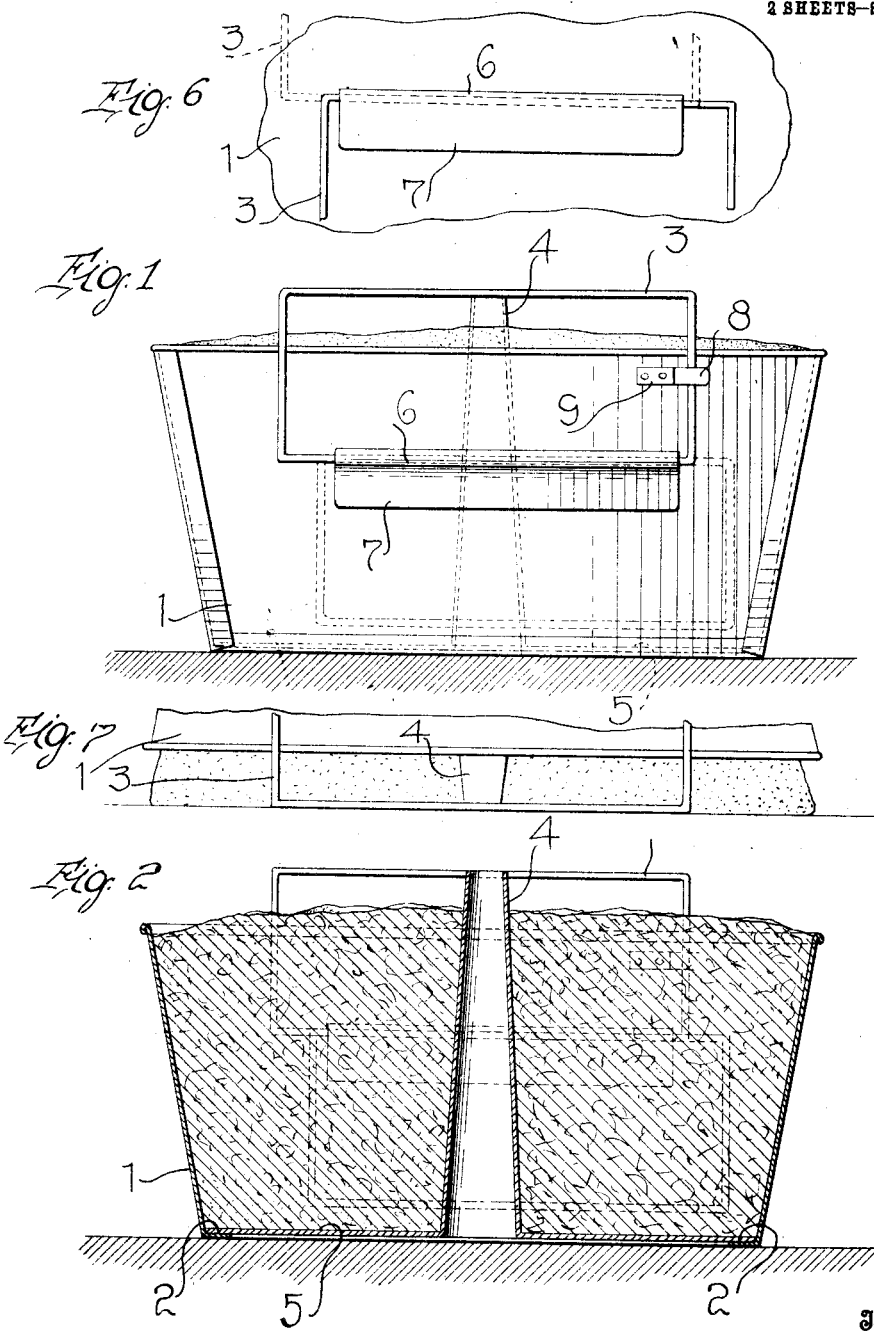

UNITED STATES PATENT OFFICE.

JOSEPHINE A. BENSON, OF VALLEY CITY, NORTH DAKOTA.

CAKE-TIN.

1,107,479. Specification of Letters Patent. Patented Aug. 18, 1914.

Application filed December 13, 1913. Serial No. 806,539.

*To all whom it may concern:*

Be it known that I, JOSEPHINE A. BENSON, a citizen of the United States, residing at Valley City, in the county of Barnes and State of North Dakota, have invented certain new and useful Improvements in Cake-Tins, of which the following is a specification, reference being had to the accompanying drawings.

This invention relates to new and useful improvements in cake tins, and particularly to that class of tins which are provided with a central hollow core.

An object of this invention is the provision of a tin of this character which is provided with means so that when the same is inverted to cool the cake, the upper edge of the tin is spaced from the support upon which it is placed, to allow air to circulate beneath the cake as well as around the tin.

A further object of this invention is the provision of a cake tin which is provided with a central upstanding core which extends above the upper edge of the tin, the body of the tin being also provided at its ends with rotatable handles which are adapted when in one position, to project above the edge of the tin to substantially the same plane as the upper end of the core, so that when the tin is inverted, the same is supported upon the handles and the core in a horizontal position, with the cake spaced from the support.

With the above and other objects in view, my invention consists in certain novel constructions, combinations, and arrangement of parts to be hereinafter more fully described, claimed, and illustrated in the accompanying drawings, in which, Figure 1 is an end elevational view of my improved cake tin; Fig. 2 is a transverse vertical sectional view through the same; Fig. 3 is a fragmentary top plan view thereof; Fig. 4 is a fragmentary perspective view of the device partly in section; Fig. 5 is a fragmentary detail vertical sectional view through one end of the device and the handles secured upon said end; Fig. 6 is a fragmentary end elevational view, showing one of the handles in its lowermost position; and Fig. 7 is a fragmentary end elevational view of the device in inverted position.

Referring more specifically to the drawings in which similar reference characters designate corresponding parts throughout the several views, 1 designates the body of the cake tin which has its lower edges directed inwardly for a short distance, as shown at 2. This tin is preferably oblong and has a pair of handles 3 secured upon the outer faces of its opposite ends and adapted to be swung to their uppermost positions above the upper edge of the tin, the purpose of which will presently appear.

The handles 3 are each formed with a section of wire bent into substantially rectangular form and having its opposite inwardly directed ends slidably and rotatably engaged in the rolled edge 6 of the plate 7 secured to the outer face of one end of the body 1. Each handle is slightly longer than the plate 7 within which it is secured, thereby making it possible to slide the handle toward one side of the body 1, then swing the handle upwardly and slide the same in the opposite direction to engage one end of the handle beneath the free offset end of the latch member 9, which latter is also secured upon the outer face of the end of the body 1, adjacent the upper edge thereof and a spaced distance from the side of the body, said latch member serving to lock the handle in uppermost position.

When the handles are locked in their uppermost positions, and the tin is inverted, said handles will coöperate with the hollow core 4 to support said tin in inverted position and thereby allow proper circulation of air beneath the cake while the same is cooling and at the same time prevent the cake from falling. The core 4 is also oblong in cross-section and extends along the longitudinal center of the tin, said core projecting upwardly from the bottom 5 which is adapted for removable engagement upon the inwardly directed lower edges 2 of the sides and ends of the cake tin body 1. It will be understood that the core 4 is open at both top and bottom and tapers slightly toward the upper end or top, which upper end or top is spaced above the upper edge of the sides and ends of the body 1 and in about the same horizontal plane as the upper edges of the handles 3. It will also be seen that the hollow core 4 is of such length that the opposite ends thereof are the same distance from the opposite ends of the body 1 as the sides of said core are from the sides of said body 1. Therefore, the central portion of the cake will be properly and thoroughly heated and baked the same as the outer portion thereof, and owing to the size and position of the hollow core 4, the central portion of the cake will be properly supported and prevented from falling during baking of the same or cooling thereof.

To assemble the parts of the cake tin, it is simply necessary to place the bottom 5 on the inwardly directed lower edges 2 of the sides and ends of the body 1 with the hollow core 4 projecting upwardly in and above said body 1. The device is then ready to receive the cake mixture and after the cake has been baked, the tin is removed from the oven and immediately inverted with the cake still in the same, said tin resting upon the handles 3 and the hollow core 4.

After the cake is thoroughly cooled, it is cut away from the sides and ends of the tin and from the outer face of the hollow core and the tin removed from around the cake. The bottom 5 and core 4 may then be readily removed from the cake by passing a knife or the like between said bottom 5 and the bottom of the cake. This form of cake tin is especially adapted for use in baking angel food, sunshine cake, and the like, which are apt to fall while baking or cooling and which must be inverted as soon as removed from the oven and allowed to remain in the tin until cooled. Another advantage of this device is that the cake is formed in halves connected by narrow end portions and, if desired, one half of the cake may be sliced without disturbing the opposite side and exposing the inner or central portion thereof to the atmosphere and thereby causing the same to dry out and become stale. Further, the connecting end portions of the cake are equal in size to the average slices cut from the halves of the cake as they are of the same width and height and could only vary in thickness. Therefore, the entire cake may be divided into slices of equal and uniform size.

From the foregoing, it will be apparent that I have provided an improved and simplified form of cake tin which may be readily and cheaply manufactured and will be highly efficient and effective in use.

While I have shown the preferred embodiment of my invention, I wish it to be understood that minor changes in the details of construction and arrangement of parts may be made within the scope of the appended claims without departing from the spirit of my invention or sacrificing any of the advantages of the same.

What is claimed is:—

1. The combination with a pan having a core projecting upwardly from the bottom thereof, the upper end of said core extending above the upper edge of said pan, of rotatable handles carried by said pan and adapted when in one position to project above the same in substantially the same plane as the upper end of the core.

2. The combination with a pan having a core projecting upwardly from the bottom thereof, the upper end of said core extending above the upper edge of said pan, of rotatable handles carried by the pan and adapted when in their uppermost positions to project above the same in substantially the same plane as the upper end of the core, and means for locking the handles in their uppermost positions.

In testimony whereof I hereunto affix my signature in the presence of two witnesses.

JOSEPHINE A. BENSON.

Witnesses:
H. M. MASON,
M. E. MASON.